Jan. 9, 1934.  E. W. McKNIGHT  1,943,086
ELECTRICAL CABLE AND METHOD OF MANUFACTURE
Filed July 2, 1932   4 Sheets-Sheet 1
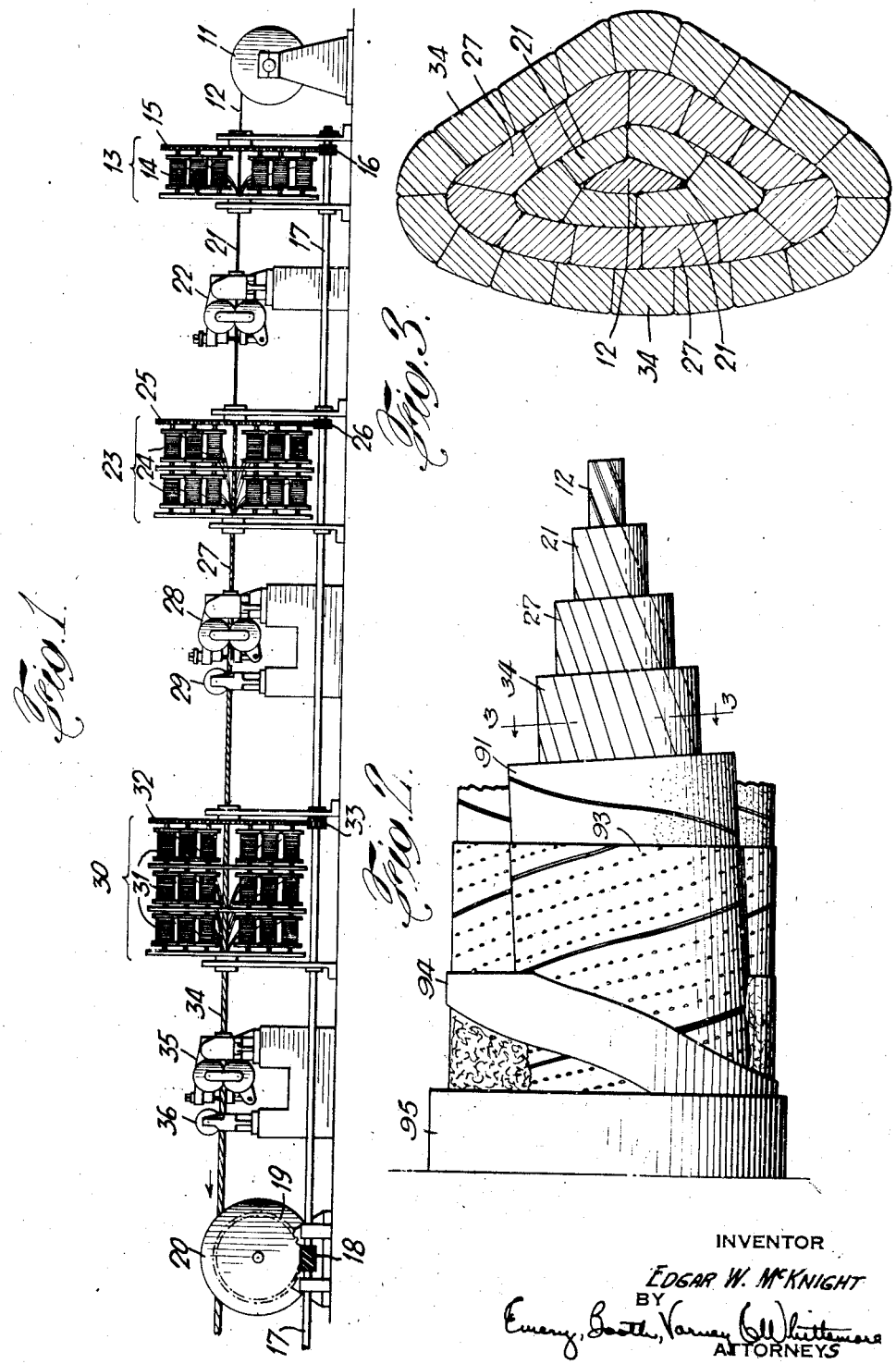
INVENTOR
EDGAR W. McKNIGHT
BY
ATTORNEYS Jan. 9, 1934.  E. W. McKNIGHT  1,943,086
ELECTRICAL CABLE AND METHOD OF MANUFACTURE
Filed July 2, 1932    4 Sheets-Sheet 2
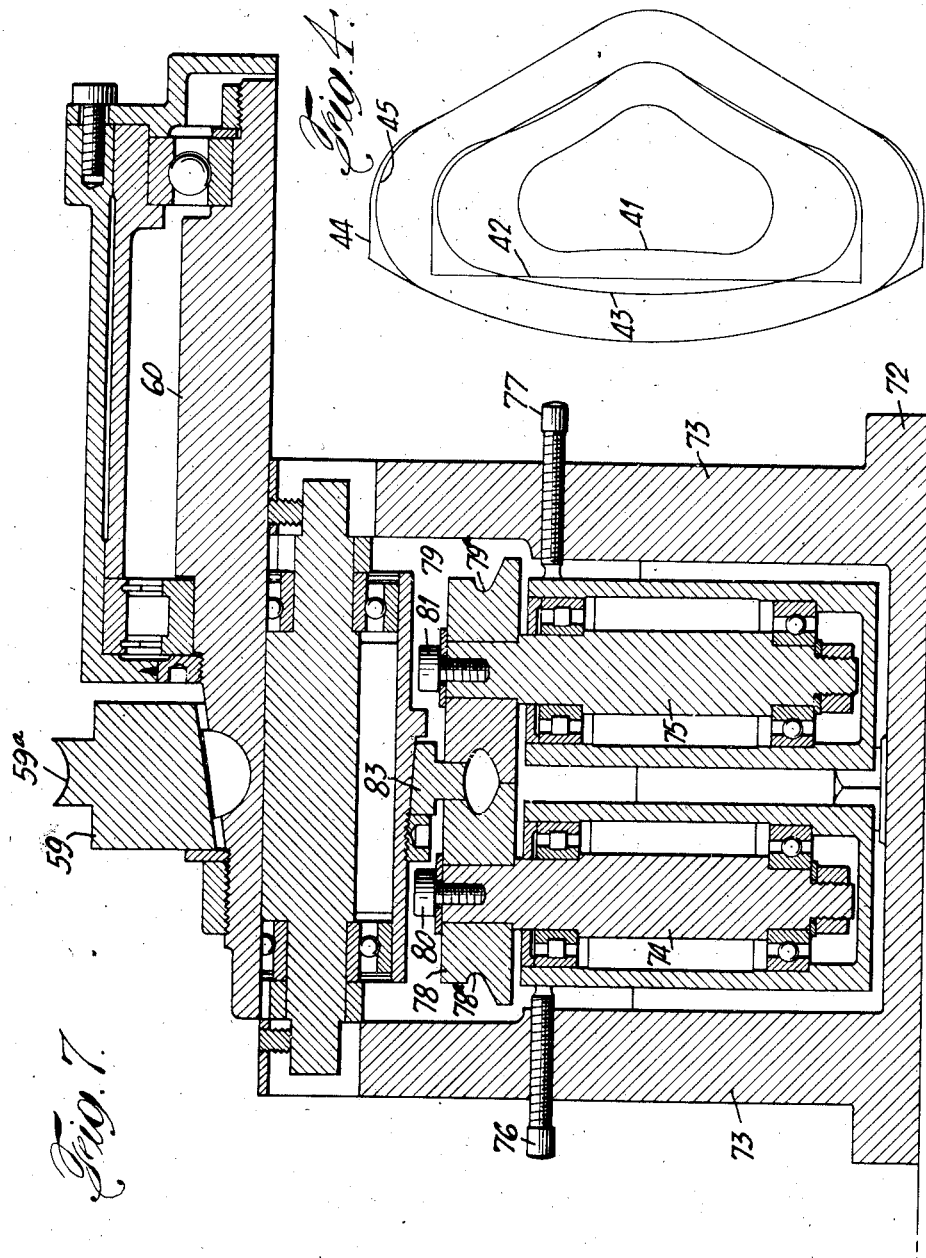
INVENTOR
EDGAR W. McKNIGHT
BY
Emery, Booth, Varney &Whittemore
ATTORNEYS

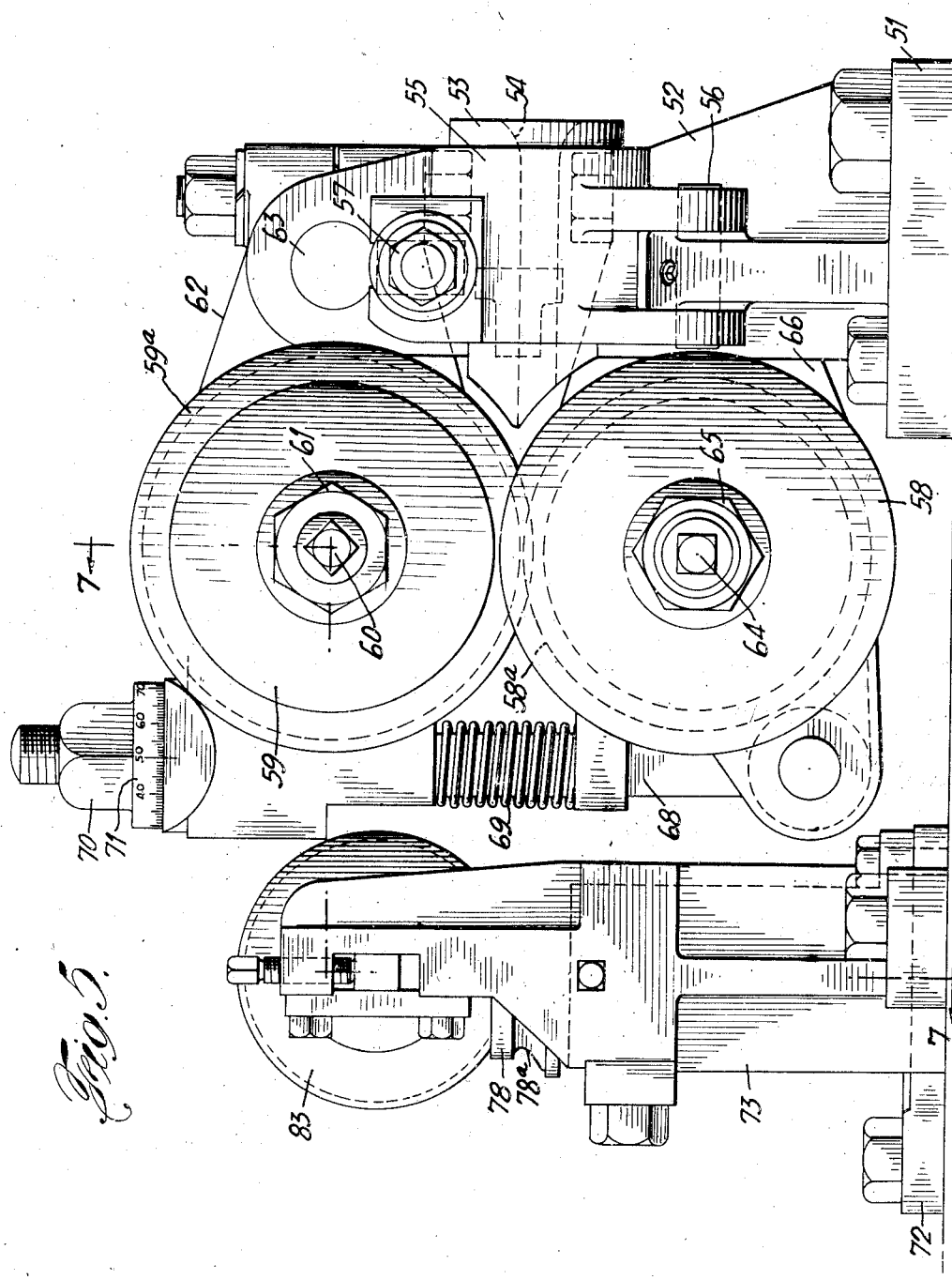

Jan. 9, 1934.  E. W. McKNIGHT  1,943,086
ELECTRICAL CABLE AND METHOD OF MANUFACTURE
Filed July 2, 1932   4 Sheets-Sheet 4

INVENTOR
EDGAR W. McKNIGHT
BY
Emery, Booth, Varney & Whittemore
ATTORNEYS

Patented Jan. 9, 1934

1,943,086

UNITED STATES PATENT OFFICE

1,943,086

ELECTRICAL CABLE AND METHOD OF MANUFACTURE

Edgar W. McKnight, Bayonne, N. J., assignor to General Cable Corporation, New York, N. Y., a corporation of New Jersey Application July 2, 1932. Serial No. 620,607

19 Claims. (Cl. 173—264)

This invention relates generally to bare and insulated electrical conductors, and specifically to stranded conductors, commonly called cables, and to the method of manufacturing the stranded conductors. More particularly, the invention is concerned with cables in which the strands, initially having shapes such that deep valleys exist therebetween, and usually initially round, are compressed and compacted together to produce a cable of the desired shape and cross section having a relatively high volume efficiency and a smoothly formed outer surface free from deep valleys. It is an object of the invention to provide an improved stranded conductor and an improved electrical cable. It is a further object of the invention to provide an improved method of manufacturing stranded conductors. Other objects and advantages of the invention will appear hereinafter.

This invention is the result of research and development work in connection with cables for the transmission of electrical energy, and more particularly sector-shaped conductors for multiple conductor cables. Merely for convenience in the description the invention will be described with particular reference to a sector-shaped electrical conductor, and the scope of the invention will be more particularly pointed out in the appended claims. A development of the present invention is described and claimed in the Frank M. Potter and Edgar W. McKnight application entitled "Electrical cable and method of manufacture", filed May 25, 1933, Serial No. 672,860.

An illustrative embodiment of the invention selected for descriptive purposes is shown in the accompanying drawings, in which:

Fig. 1 is a somewhat diagrammatic showing of apparatus for manufacturing a multiple strand cable;

Fig. 2 is a side elevation of a short length of three conductor, sector shaped cable, the cable sheath being partially cut away, and the shielding, insulation and several layers of wires of one conductor being progressively cut away to disclose the construction more clearly;

Fig. 3 is a section through one of the conductors of the cable of Fig. 2, to enlarged scale, substantially on the line 3—3;

Fig. 4 shows in superimposed relation the passes through the several cable rolling units of Fig. 1;

Fig. 5 is an elevation of two of the cable rolling units;

Fig. 7 is a section substantially on the line 7—7 of Fig. 5.

Figure 6:
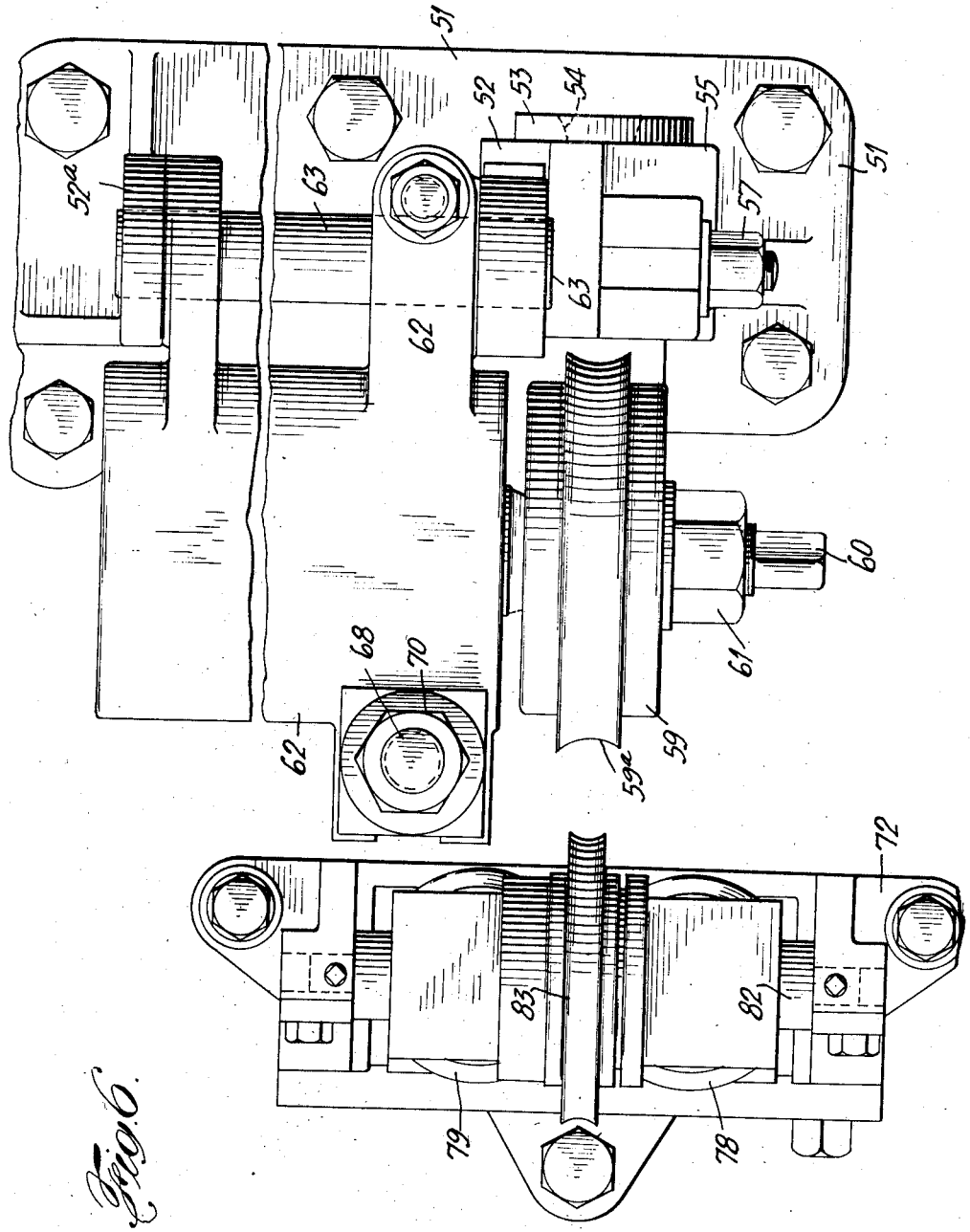
Fig. 6 is a top plan view of the apparatus shown in Fig. 5.

Multiple conductor cables, and particularly three conductor cables, are used extensively for underground transmission of electrical power. These multiple conductor cables comprise a plurality of individually insulated conductors which are twisted together and then usually bound together with a spiralled binding tape or with an overlying belt of insulation. The cable thus formed is enclosed within an impervious outer sheath, ordinarily lead or a lead alloy.

In the first multiple conductor cables the conductors were round in cross section, and the sector conductor originated from a desire to reduce the over-all diameters of the cables. The use of sector conductors permits the installation of cables of greater current carrying capacity as compared to round conductor cables. Also there is an important saving in insulating and sheathing materials.

As a result of my consideration of this subject leading up to the invention which will hereinafter be described, I have found that the ideal sector conductor is one of such shape that when insulated it fits with the other insulated conductors to form a perfectly round cable in which all of the conductor insulation is of uniform thickness and uniformly compressed. Except as hereinafter noted, this ideal sector conductor has a cross section which is a modified circular sector whose periphery consists of an arc concentric to the periphery of the cable inside of the binding tape or belt insulation and the two radii of the sector diverging, from a point on the cable radius, at an angle of 120 degrees for the three conductor cable, or at an angle of 90 degrees for a four conductor cable.

In order to avoid a dangerous concentration of surface stresses at the sharp angles on the edges and vertex of the sector it is necessary to make these edges and the vertex round with circular arcs whose radii have lengths in proportion to the voltage for which the cable is designed. This rounding of the edges and vertex also is required to enable the application of insulating tapes to the conductor smoothly and under uniform tension.

The surface of the ideal sector conductor should be smooth and unbroken, that is, free from depressions and projections. In order that the surface stresses may be uniformly distributed it is important that no sharp projections or edges occur on the surface of the conductor.

The ideal sector conductor will be so constructed that it will have a minimum "V-gauge" depth, and still be flexible so that it may readily be bent in any direction without disturbing the outer surface of the conductor. The "V-gauge" depth is the distance from the intersection of the radii of the sector conductor to a point on the arc of the sector midway between the edges. It will be apparent that the outside diameter of the finished cable is dependent on the V-gauge depth of the conductors.

While it is desirable to make the V-gauge depth as small as possible, the cross sectional conducting area of the conductor is fixed by the cable specifications, and the V-gauge depth therefore can be reduced only by elimination, insofar as is possible, of non-conducting areas between strands in the conductor cross section. In other words, the volume efficiency of the conductor should be a maximum. By "volume efficiency" is meant the ratio of the total actual cross section of copper to the area of the plane figure formed by a smooth curved line circumscribing the cross section.

A solid sector conductor would have the maximum volume efficiency and could be made with an extremely smooth outer surface. However, such a conductor would be very inflexible, and the stresses set up in the bending of a three-conductor electrical cable having large solid conductors would tend to destroy the round shape of the cable and break the binding tape. Therefore, multiple conductor power cables commonly are made with stranded conductors.

To approach the ideal cable it will be necessary to compact the strands and give a definite predetermined shape and smooth surface to the sector conductors in the manner hereinafter described. This invention provides an improved sector conductor which more nearly approaches the ideal than any sector conductor heretofore available, and also provides a method for producing the improved sector conductor in an economical manner.

Heretofore in the manufacture of multi-layer stranded cables it has been the practice to lay the strands in opposite helical directions in alternate layers. This has been necessary in order to prevent strands of one layer from dropping into the helically extending valleys between the strands of the preceding layer and thereby impairing the outer contour of the cable.

If cables having the strands in adjacent layers laid in opposite helical directions are crushed or rolled the strands are badly deformed where they cross each other. This deformation of the strands reduces the tensile strength of the cable and increases its electrical resistance. Even more serious is the interlocking or mortising together of the strand layers by reason of the strand deformation. This interlocking of the layers materially reduces the flexibility of the cable and prevents the making of short bends in the cable without the formation of baskets, that is, the bulging or spreading apart of the strands. This problem is of great importance in electrical cables where the cables must be bent during manufacture and installation, and where any displacement or radial movement of the outer strands might seriously damage the overlying conductor insulation.

According to this invention each layer of strands in the cable is rolled before the next layer is applied so as to provide a substantially smooth even surface free from deep valleys as a foundation for the succeeding layer. The strands in all of the layers may then be laid in the same general helical direction without the disadvantages enumerated above, and such cable will have a high degree of flexibility because the smooth parallel strands can slide easily on each other. In electrical cables there is a further advantage in that the alternating current resistance is reduced if the strands extend in substantially parallel courses.

Referring first to Fig. 1, there is shown, more or less diagrammatically, apparatus for the manufacture in accordance with this invention of a thirty-seven strand sector-shaped cable having a high volume efficiency, an ideal shape and a smooth outer surface free from sharp edges. At the right hand end of the figure is a reel 11 containing a supply of wire 12 which serves as the center core for the cable. The wire 12 passes from the supply reel 11 to the left through the flyer 13 which wraps the layer of wires 21 helically around the core 12. The flyer 13 comprises spaced parallel disks which are suitably connected and mounted to rotate together, and between which are mounted a plurality of wire supply reels 14. In this illustrative embodiment, where all of the cable wires are the same size, there are six of the wire supply reels 14.

In operation the flyer 13 is rotated, as by means of a gear 15 on the outer periphery of one of the disks which meshes with a gear 16 rigidly secured on a main drive shaft 17 extending the full length of the apparatus. The shaft 17 may be driven by means of any suitable source of power, (not shown). Conveniently this shaft is connected, for example through the worm 18 on the shaft 17 and the worm gear 19 rigidly secured on the capstan 20 to drive the capstan which draws the cable through the apparatus.

As the flyer 13 rotates about the longitudinally moving wire 12, the wires 21 are drawn from the supply reels 14 and wrapped helically about the core 12. From the flyer 13 the core, which now comprises seven strands, passes through a rolling unit 22 which will be described in greater detail hereinafter. In passing through the rolling unit 22 the seven strand core is rolled in a vertical plane to materially alter the shape of the individual strands and compress them together so as to give to the core the enclosing contour substantially as shown at 41 in Fig. 4.

From the rolling unit 22 the seven strand core passes through the flyer 23. The flyer 23 comprises three parallel spaced disks which are connected and mounted to rotate together. Between the spaced disks are mounted a plurality of wire supply reels 24. In the illustrative embodiment there are twelve of the wire supply reels 24. The flyer 23 is rotated, for example, by means of a gear 25 on the outer periphery of one of the disks which meshes with a gear 26 rigidly secured on the drive shaft 17. As the seven strand core passes through the flyer 23 a layer of wires 27 from the supply reels 24 will be stranded helically about the core in the same direction as the wire 21.

From the flyer 23 the core, now comprising nineteen strands, passes to a rolling unit 28 which may be generally similar in construction to the rolling unit 22. The unit 28 rolls the core along the minor axis of a transverse section, and the pass through the rolls of the unit desirably has a shape substantially as shown at 42 in Fig. 4.

From the rolling unit 28 the core passes directly to a rolling unit 29 which differs in construction from the units 22 and 28, and which will be described in greater detail hereinafter. The unit 29 rolls the core along the major axis of a transverse section, while at the same time limiting expansion along the minor axis. This rolling unit forces the strand material inwardly from the edges of the core, thereby reducing the spaces between the strands and imparting to the core a substantially smooth surface free from sharp edges and deep valleys. The pass through the rolling unit 29 desirably has a shape substantially as shown at 43 in Fig. 4.

From the rolling unit 29 the nineteen strand core passes through the flyer 30 comprising four parallel spaced disks which are connected and mounted to rotate together. Between the spaced disks are mounted a plurality of wire supply reels 31. Conveniently the flyer 30 is rotated by means of a gear 32 on the outer periphery of one of the disks which meshes with a gear 33 rigidly secured on the drive shaft 17. In the illustrative embodiment there are eighteen of the wire supply reels 31, and as the flyer 30 rotates there will be helically wrapped about the nineteen strand core over the layer 27 a layer of eighteen wires 34. The wires 34 desirably are stranded in the same general helical direction as the wires 21 and 27.

From the flyer 30 the thirty-seven strand core passes to a rolling unit 35 which may be generally similar in construction to the units 22 and 28. The unit 35 rolls the cable along the minor axis of a transverse section, and desirably the pass through this rolling unit has a contour substantially as shown at 44 in Fig. 4. From the rolling unit 35 the cable passes to the rolling unit 36 which may be generally similar in construction to the unit 29. The unit 36 rolls the cable along the major axis of a transverse section and gives to the cable the desired cross section and a smooth outer surface. The pass through the rolling unit 36 desirably has a contour substantially as shown at 45 in Fig. 4.

The construction of the cable rolling units shown in Fig. 1 is disclosed in greater detail in Figs. 5, 6 and 7. The units 22, 28 and 35 are illustrated in the right hand portion of Figs. 5 and 6, and the units 29 and 36 appear at the left in these figures.

The units 22, 28 and 35 differ from each other only in the cable guides and the rolls which define the passes through these units. The units roll the cable in one plane, namely along the minor axis of a transverse section. Referring particularly to Figs. 5 and 6, the base 51 has an upwardly projecting standard 52 in which is removably mounted a guide 53 having a throat 54 for directing the cable to the rolls. In this particular embodiment the guide 53 is held in place by means of a plate 55 hinged to the standard 52 at 56 and normally secured in closed position by means of a nut and screw 57. The guide 53 is easily removable and may be interchanged with other guides to permit the use of the rolling unit for different sized cables.

From the guide 53 the cable, which is not shown in these figures, passes to the left between the rolls 58 and 59. The upper roll 59 is secured on one end of a shaft 60, as by means of a nut 61. The shaft 60 is rotatably mounted in a housing 62 which has a limited turning movement about a shaft 63 mounted in the upper ends of the standards 52 and 52a. It will be apparent that the roll 59 may be easily removed and replaced by other rolls for rolling different sized or shaped cables.

The lower roll 58 is mounted directly below the roll 59 on one end of a shaft 64. The roll 58 is held in place as by means of a nut 65. The shaft 64 is rotatably mounted in a housing 66 which is secured to the standard 52 below and in a manner generally similar to the housing 62.

Pivotally secured on the outer end of the housing 66 is an upwardly extending rod 68 which passes through a vertically extending opening in the outer end of the housing 62. Desirably means such as a spiral spring 69 surrounding the rod 68 normally tends to force the housings and rolls apart. The upper end of the rod 68 is screw-threaded and is provided with a nut 70 for drawing the rolls together against the force of the spring 69. Desirably the nut 70 is provided with a scale at 71 whereby accurate and uniform adjustment of the rolls may be secured.

The lower roll 58 is provided on its edge with an annular groove 58a, the bottom of which is designed in accordance with the shape to be given to the lower half of the cable in passing between the rolls 58 and 59. The upper roll 59, as is clearly shown in Figs. 6 and 7, is provided with a raised rim 59a which exactly fits into the groove in the lower roll 58 and which gives to the upper portion of the cable the desired shape as the cable passes between the rolls.

It will be apparent that in the construction described the rolls may be easily adjusted and readily interchanged. The construction permits extremely accurate rolling of the cable, and compresses the cable in the plane of the minor axis of the transverse section.

The units 29 and 36 differ from each other only in the rolls which define the passes through these units. These units roll the cable along the major axis of a transverse section, and at the same time limit expansion of the cable along the minor axis by reason of simultaneous rolling along the minor axis.

Referring to Figs. 5, 6 and 7, the base 72 has an upwardly projecting housing 73 in which are rotatably mounted the vertical shafts 74 and 75. These shafts 74 and 75 have no freedom of movement in the direction of movement of the cable through the unit, but are adjustable toward and away from each other as by means of the screws 76 and 77.

Secured on the upper end of the shafts 74 and 75 are the edging rolls 78 and 79. Desirably these rolls are removably secured on the shafts as by means of screws 80 and 81 so that they may be interchanged for different sized cables.

The rolls 78 and 79 are identical, and are provided on their edges with annular grooves 78a and 79a which are accurately machined to compress the cable along the major axis of a transverse section and to accurately shape the edges of the cable. Preferably the lower edges of the rolls contact with each other, and the upper edges of the rolls are spaced apart. It will be seen that these rolls force the material in the edges of the cable inwardly, reducing the spaces between the strands and giving an accurate shape and a uniformly smooth surface to the edges of the cable.

Mounted in the upper end of the housing 73 is a vertically adjustable horizontal shaft 82 carrying a roll 83. The roll 83, as is clearly shown in Figs. 6 and 7, is provided on its periphery with a raised rolling surface which enters between the upper edges of the rolls 78 and 79 and is designed to complete the pass for the cable. Thus it will be seen that while the units 29 and 36 roll the cable along the major axis of the transverse section, the shape over the entire cross section is accurately controlled during this rolling operation.

In Fig. 2 is shown a side elevation of a short length of three-conductor electrical cable embodying my compressed stranded conductors. Three similar thirty-seven strand, sector shaped conductors are each enclosed within a wall 91 of insulating material. In the illustrative embodiment belt insulation is not shown, and in accordance with the conventional practice the conductors are shielded as shown at 93. The insulated and shielded conductors are cabled together and bound together with the helical tape 94. Enclosing the conductors so bound together is a sheath 95. In Fig. 3 is shown to enlarged scale a cross section through one of the conductors.

It will be seen that the outer surface of the cable (the stranded conductor) is uniformly smooth and free from deep indentations and sharp edges or projections. Although all of the strands extend in the same general helical direction, there is no mortising together of the cable layers, and the cable is readily flexible and may be bent on a small radius without the formation of baskets.

The cable is accurately rolled to the ideal cross section, and the spaces between the strands are greatly reduced in size. Sector-shaped cables made according to this invention have shown a volume efficiency of 89%, whereas tests on sector cables made by seven of the leading electrical cable manufacturers show volume efficiencies ranging from a low of 80% to a high of 84%.

The foregoing description of certain specific embodiments of the invention is illustrative merely, and is not intended as defining the limits of the invention.

I claim:

1. A stranded electrical conductor comprising a core and a plurality of overlying layers of initially round strands, which layers have been individually rolled to compress and change the shape of the round strands and give to each layer throughout its entire periphery a substantially smooth outer surface free from deep valleys.

2. A stranded electrical conductor of relatively high volume efficiency comprising a core of electrically conductive material and a plurality of closely overlying layers of helically laid strands all extending in the same general helical direction, the strands initially having shapes such that the outer surfaces of the layers have deep valleys, having been compacted layer by layer to provide each layer with a substantially smooth outer surface free from deep valleys.

3. A stranded electrical conductor of relatively high volume efficiency comprising a multiplicity of strands laid up in layers, the strands initially having cross sections such that the outer surfaces of the layers have deep valleys, each layer of strands having been separately compacted in situ by rolling to change the cross sections of the individual strands and provide throughout the entire periphery of the layer a substantially smooth outer surface free from deep valleys.

4. A stranded electrical conductor comprising a core and a plurality of closely overlying conducting layers, each layer comprising a plurality of helically arranged strands initially having cross sectional shapes such that the outer surfaces of the conducting layers have deep valleys, said strands having been rolled layer by layer in situ to change the individual strand shapes so that at any cross section through the conductor each layer has a smoothly formed outer contour free from deep valleys.

5. A stranded electrical conductor comprising a core and a plurality of overlying layers of strands initially having cross sections such that deep valleys exist on the outer surfaces of the layers, which layers have been individually compacted to compress and change the shape of the strands and give to each such layer throughout its entire periphery a substantially smooth outer surface free from deep valleys.

6. A stranded electrical conductor comprising a plurality of overlying layers of helically extending strands initially having cross sections such that deep valleys exist on the outer surfaces of the layers, which layers have been individually compacted to compress and change the shape of the strands and give to each such layer throughout its entire periphery a substantially smooth outer surface free from deep valleys.

7. A stranded electrical conductor comprising a core and a plurality of overlying layers of strands, the strands in at least several of said layers initially having cross sections such that deep valleys exist on the outer surfaces of the layers, which layers have been individually compacted to compress and change the shape of the strands and give to each such layer throughout its entire periphery a substantially smooth outer surface free from deep valleys.

8. A stranded electrical conductor comprising a core and a plurality of overlying layers of strands initially having cross sections such that deep valleys exist on the outer surfaces of the layers, at least several of said layers having been individually compacted to compress and change the shape of the strands and give to each such layer throughout its entire periphery a substantially smooth outer surface free from deep valleys.

9. A stranded, sector-shaped electrical conductor comprising a core and a plurality of overlying layers of strands initially having cross sections such that the outer surfaces of the layers have deep valleys, said strands having been rolled layer by layer along both the minor and major axes of a transverse section to provide each layer with uniformly even and smoothly rounded edges free from deep valleys.

10. A stranded, sector-shaped electrical conductor comprising a core and a plurality of overlying layers of helically arranged strands initially having shapes such that deep valleys exist on the layer surfaces, said strands having been compacted under pressure layer by layer to change the shapes of the strands and provide each layer with a smoothly formed outer surface free from deep valleys, said conductor having uniformly even and smoothly rounded edges and a volume efficiency greater than 85%.

11. An electrical cable comprising an insulated conductor enclosed in a sheath, said conductor comprising a core and a plurality of overlying layers of strands initially having cross sections such that deep valleys exist on the outer surfaces of the layers, which layers have been individually compacted to compress and change the shape of the strands and give to each such layer throughout its entire periphery a substantially smooth outer surface free from deep valleys.

12. A multiple conductor electrical cable comprising a plurality of insulated conductors enclosed in a sheath, each conductor comprising a plurality of overlying layers of helically laid wires initially having cross sections such that the outer surfaces of the layers have deep valleys, said wires having been compacted in situ layer by layer to materially alter the individual wire shapes and provide each layer with a smoothly formed outer surface free from deep valleys.

13. The method of manufacturing a stranded electrical conductor having a core of electrically conductive material and a plurality of overlying layers of conducting strands initially having shapes such that deep valleys would exist on the outer surfaces of the layers, which method comprises compacting the strands layer by layer to alter their shapes and provide the layers throughout their entire peripheries with substantially smooth outer surfaces free from deep valleys.

14. The method of manufacturing a stranded electrical conductor having a high volume efficiency and a uniformly even outer surface free from deep valleys, which method comprises stranding a plurality of wires together to form an inner core, said wires initially having shapes such that deep valleys exist on the surface of the core, compacting the core wires together and changing their shapes by rolling to provide the core with a smoothly formed surface free from deep valleys, stranding over the compacted core a layer of wires initially having shapes such that deep valleys exist on the outer surface of the layer, compacting the overlying layer of wires and simultaneously changing their individual shapes by rolling until the outer surface is uniformly smooth and free from deep valleys.

15. The method of manufacturing a multi-layer, stranded electrical conductor which comprises assembling a plurality of core strands, compressing and shaping the assembled strands until the outer surface of the core is smoothly formed and free from deep valleys, enclosing the core with a layer of helically laid strands initially having shapes such that deep valleys exist on the outer surface of the layer, and compressing and shaping the conductor until the outer surface is smoothly formed and free from deep valleys.

16. The method of manufacturing a stranded electrical conductor having a core and a plurality of overlying layers of helically arranged strands initially having shapes such that deep valleys exist on the layer surfaces, which method comprises compacting the strands under pressure layer by layer first in one plane and then in a plane substantially at right angles to the first to alter the shapes of the individual strands and provide each layer around its entire periphery with a substantially smooth outer surface free from deep valleys.

17. The method of manufacturing a stranded, sector-shaped electrical conductor having a relatively high volume efficiency and even, smoothly rounded edges, which method comprises assembling a plurality of core strands, compressing and shaping the assembled strands until the outer surface of the core is smoothly formed, enclosing the core with a layer of helically laid strands, and compressing and shaping the so-enclosed core along both the minor and major axes of a transverse section through the cable until the entire cable surface is smoothly formed and free from deep valleys.

18. The method of manufacturing a stranded, sector-shaped electrical conductor from wires initially having shapes such that deep valleys exist on the conductor surface, which method comprises compacting the conductor under pressure along the minor axis of the transverse section to shape the conductor and cause the metal in the wires to flow and substantially fill the deep valleys on the long sides of the conductor, releasing the pressure on the minor axis of the conductor thereby permitting the wires to spring back slightly, compacting the conductor under pressure along the major axis of the transverse section and simultaneously limiting expansion of the conductor along the minor axis to further shape the conductor and cause the metal in the wires to flow and substantially fill the deep valleys on the edges of the conductor and give to the finished conductor a smoothly formed outer surface free from deep valleys around its entire periphery, each wire having been changed in shape throughout its length by the compacting operations.

19. The method of manufacturing a stranded sector-shaped electrical conductor having a core and a plurality of overlying layers of helically arranged strands initially having shapes such that deep valleys exist on the layer surfaces, which method comprises compacting the strands under pressure layer by layer along both the major and minor axes of a transverse section to alter the shapes of the individual strands and provide each layer around its periphery with a substantially smooth outer surface free from deep valleys.

EDGAR W. McKNIGHT.